(12) United States Patent
Sartin et al.

(10) Patent No.: US 11,724,336 B2
(45) Date of Patent: Aug. 15, 2023

(54) APPARATUS FOR A LASER WELDING SYSTEM

(71) Applicant: HONEYWELL FEDERAL MANUFACTURING & TECHNOLOGIES, LLC, Kansas City, MO (US)

(72) Inventors: Bryan Sartin, Kansas City, MO (US); Michael McNary, Kansas City, MO (US)

(73) Assignee: HONEYWELL FEDERAL MANUFACTURINGS TECHNOLOGIES, LLC, Kansas City, MO (US)

( * ) Notice: Subject to any disclaimer, the term of this patent is extended or adjusted under 35 U.S.C. 154(b) by 784 days.

(21) Appl. No.: 16/269,119

(22) Filed: Feb. 6, 2019

(65) Prior Publication Data
US 2020/0246913 A1 Aug. 6, 2020

(51) Int. Cl.
*B23K 26/12* (2014.01)
*B23K 26/14* (2014.01)
(Continued)

(52) U.S. Cl.
CPC .......... *B23K 26/142* (2015.10); *B23K 26/127* (2013.01); *B23K 26/144* (2015.10); *B23K 26/1436* (2015.10); *B23K 26/1464* (2013.01)

(58) Field of Classification Search
CPC ...... B22F 2999/00; B22F 12/00; B22F 10/10; B22F 10/70; B22F 10/20; B22F 2201/10; B22F 3/1025; B22F 2201/00; B22F 2203/00; B22F 2998/10; B22F 2003/244; B22F 3/003; B22F 10/30; B22F 3/1021; B22F 10/00; B22F 2203/13; B22F 7/08; B22F 2202/01; B22F 3/10; B22F 10/37; B22F 12/67; B22F 12/90; B22F 2201/20; B22F 3/004; B23K 26/342; B23K 26/123;
(Continued)

(56) References Cited

U.S. PATENT DOCUMENTS 3,875,531 A 4/1975 Buczek et al.
7,807,947 B2 10/2010 Partanen et al.
(Continued)

*Primary Examiner* — Chris Q Liu
(74) *Attorney, Agent, or Firm* — Hovey Williams LLP

(57) ABSTRACT

A laser welding system for welding a component and reducing defects in the weld by ensuring uniform, laminar gas flow over a process area of the system. The laser welding system comprises a laser for welding the component, a platform for supporting the component, an enclosure surrounding the platform, a first actuatable barrier, a second actuatable barrier, an actuator, and a controller. The enclosure includes a plurality of walls, one of the walls having an inlet and another wall having an outlet. The inlet and outlet each having an opening having a cross-sectional area for letting gas flow through. The first and second barriers are configured to modify the cross-sectional areas of the openings when actuated. The actuator is configured to actuate the barriers, and the controller is configured to direct the actuator to actuate the barriers so that the cross-sectional area of the first opening is larger than the cross-sectional area of the second opening so that a pressure at the inlet is greater than a pressure at the outlet.

11 Claims, 2 Drawing Sheets

(51) Int. Cl.
*B23K 26/142* (2014.01)
*B23K 26/144* (2014.01)

(58) Field of Classification Search
CPC .............. B23K 26/142; B23K 26/1436; B23K 26/144; B23K 26/127; B23K 26/1464
USPC .......................................................... 219/440
See application file for complete search history.

(56) References Cited

U.S. PATENT DOCUMENTS

| | | | |
|---|---|---|---|
| 8,207,472 B2 | 6/2012 | Kosmowski | |
| 8,506,754 B2 | 8/2013 | Moshtagh et al. | |
| 9,577,111 B2 | 2/2017 | Ye | |
| 9,579,750 B2 | 2/2017 | Hunter et al. | |
| 2002/0090410 A1* | 7/2002 | Tochimoto | B29C 64/321 |
| | | | 425/215 |
| 2005/0116391 A1* | 6/2005 | Lindemann | B29C 64/357 |
| | | | 264/497 |
| 2009/0154908 A1* | 6/2009 | Engle | C23C 16/4485 |
| | | | 219/440 |
| 2016/0307678 A1* | 10/2016 | Unosson | B23K 26/703 |
| 2018/0126460 A1* | 5/2018 | Murphree | B29C 64/245 |
| 2020/0061655 A1* | 2/2020 | Wakelam | B29C 64/371 |

* cited by examiner

US 11,724,336 B2

APPARATUS FOR A LASER WELDING SYSTEM

STATEMENT REGARDING FEDERALLY-SPONSORED RESEARCH OR DEVELOPMENT

This invention was made with government support under Contract No.: DE-NA0000622 awarded by the Department of Energy. The government has certain rights in the invention.

BACKGROUND

A laser welding system uses a high-energy laser to fuse components together. The energy from the laser beam causes a melt pool to form where the light is focused. When metal material is used to weld components, the melt pool emits metal vapor and solid particles which can cause defects in the components and/or the weld.

One way of reducing such defects is by removing the metal vapor and solid particles during the welding process. This may be accomplished by circulating gas over the melt pool during welding to blow the vapor and particles away from the process area. However, too much circulation results in turbulence, which may also cause defects in the weld. Further, since the welding process often occurs in a closed environment, the turbulence caused by the gas may pull metal vapor and solid particles back into the melt pool. Simply reducing the circulation rate is ineffective because not enough vapor and particles are removed.

The background discussion is intended to provide information related to the present invention which is not necessarily prior art.

SUMMARY

The present invention solves the above-described problems and other problems by providing an apparatus for ensuring uniform, laminar gas flow in the vicinity of a melt pool during a laser welding process so that sufficient metal vapor and/or solid particles are removed while also not causing additional defects.

An apparatus constructed in accordance with an embodiment of the present invention broadly comprises a platform, an enclosure surrounding the platform, a first actuatable barrier, a second actuatable barrier, an actuator, and a controller. The platform is provided for supporting the part to be processed. The enclosure surrounds the platform and includes an inlet and an outlet. The inlet receives gas flow from outside the enclosure and includes a first opening with a cross-sectional area. The outlet of the enclosure allows gas flow to exit the enclosure and includes a second opening with a cross-sectional area. The first actuatable barrier is configured to modify the cross-sectional area of the first opening when actuated. The second actuatable barrier is configured to modify the cross-sectional area of the second opening when actuated. The actuator is configured to actuate the first actuatable barrier and the second actuatable barrier.

The controller controls the movement of the actuatable barriers so that the cross-sectional area of the first opening is larger than the cross-sectional area of the second opening so that a pressure at the inlet is greater than a pressure at the outlet. By making the cross-sectional area of the first opening larger than the cross-sectional area of the second opening, the velocity of the gas exiting the enclosure at the outlet is higher than the velocity of the gas entering the enclosure at the inlet. This increases a static pressure differential and makes the flow of the gas more uniform and laminar.

The above-described apparatus may also comprise a plurality of sensors positioned at the inlet and the outlet to detect a pressure at the inlet, a pressure at the outlet, a velocity of gas flow at the inlet, and/or a velocity of gas flow at the outlet. The controller receives signals from the sensors representative of the pressure at the inlet, the pressure at the outlet, the velocity of gas flow at the inlet, and the velocity of gas flow at the outlet; analyzes the static pressure at the inlet, the static pressure at the outlet, the velocity of gas flow at the inlet, and the velocity of gas flow at the outlet to determine whether there is laminar gas flow over the process area; and directs the actuator to actuate the first actuatable barrier and the second actuatable barrier until the cross-sectional area of the first opening is larger than the cross-sectional area of the second opening, the pressure at the inlet is greater than the pressure at the outlet, and the velocity of gas flow at the inlet is lower than the velocity of gas flow at the outlet.

Another embodiment of the invention is a method of ensuring uniform, laminar flow of gas over a process area of a laser welding system. The method broadly comprises blowing gas over a platform inside an enclosure having an inlet and an outlet; actuating a first actuatable barrier near the inlet to modify a cross-sectional area of an opening of the inlet; and actuating a second actuatable barrier near the outlet to modify a cross-sectional area of an opening of the outlet so that the cross-sectional area of the opening of the inlet is larger than the cross-sectional area of the opening of the outlet so that a pressure at the inlet is greater than a pressure at the outlet.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
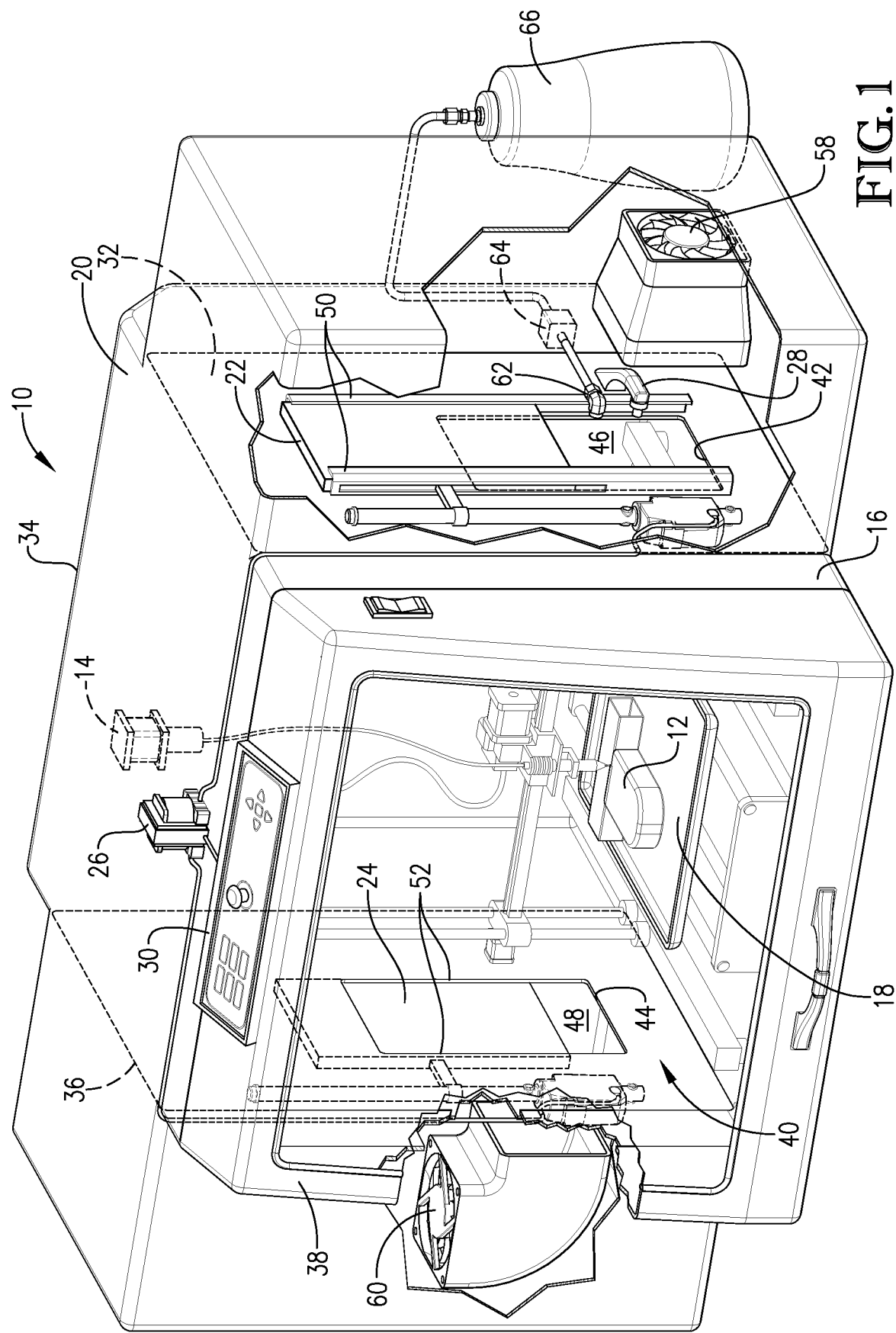
FIG. 1 is an isometric view of an exemplary laser welding system constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a laser welding system 10 constructed in accordance with an embodiment of the invention is illustrated. The laser welding system 10 processes a component 12, such as welding the component 12 or fabricating the component 12 using techniques such as additive manufacturing, rapid prototyping, three-dimensional printing, or the like. The laser welding system 10 may be a once-through type system that uses gas only once during the laser welding process or a closed system using recirculated gas. The gas may be inert gas, such as helium, argon, or a combination thereof. The laser welding system 10 may comprise a laser 14 and an apparatus 16 for supporting the component 12 during processing.

The laser 14 generates high-intensity light for melting material used for processing the component 12. In some embodiments, the laser 14 may instead be another source for directing energy to melt material, such as an electron beam or plasma arc. The material to be melted may be metal, but in some embodiments, it may include any material used in additive manufacturing, such as powder, polymers, carbon-infused material, etc.

The apparatus 16 controls emissions resulting from the processing of the component 12 and includes a platform 18 for supporting the component 12, an enclosure 20 surrounding the platform 18, a first actuatable barrier 22, a second actuatable barrier 24, an actuator 26, a sensor 28, and a controller 30.

The platform 18 supports the component 12 while the component 12 is being processed. In some embodiments, the platform 18 may be moveable in a vertical direction and include an additive manufacturing powder bed.

Figure 2:
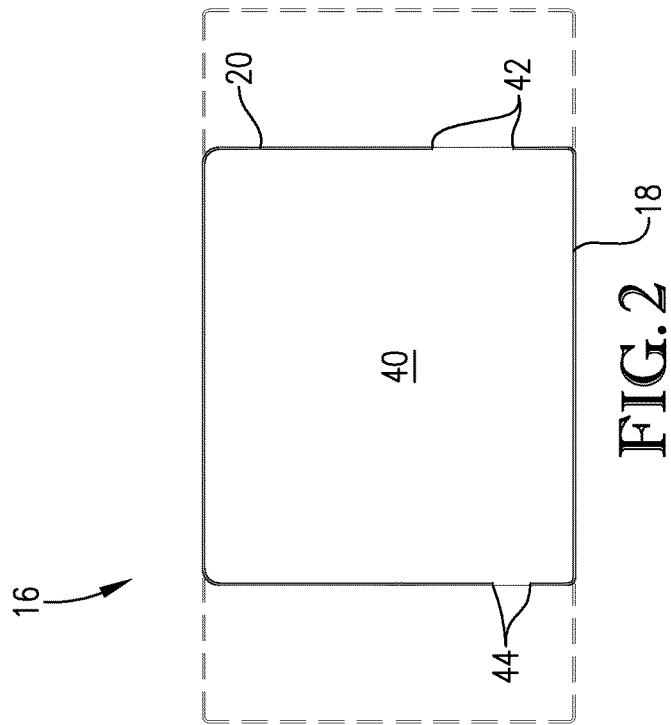
FIG. 2 is a schematic view of the laser welding system of FIG. 1.

The enclosure 20 surrounds the platform 18. An embodiment of the enclosure 20 includes four walls 32, 34, 36, 38, thereby defining the process area 40. Two of the walls 32, 36 are on opposite sides of the platform 18 and face one another. One of the walls 32 includes an inlet 42 configured to receive gas flow from outside the enclosure 20. The opposing wall 36 includes an outlet 44 configured to allow gas flow to exit the enclosure 20. The inlet 42 includes a first opening 46 having a cross-sectional area, and the outlet 44 has a second opening 48 also having a cross-sectional area. The cross-sectional areas are the areas of cross-sections of the openings 46, 48 through which gas may flow. While FIG. 1 depicts the platform 18 and enclosure 20 forming a substantially rectangular shape, the platform 18 and enclosure 20 may be any number of shapes without departing from the scope of the present invention. Further, the walls 32, 36 having the inlet 42 and outlet 44 may alternatively be substantially adjacent to one another. In some embodiments, the inlet 42 and outlet 44 may be on the same wall. Additionally, the enclosure 20 may include a plurality of inlets 42 and/or a plurality of outlets 44. The inlet 42 is preferably positioned at a height that is higher than the outlet 44, as shown in FIG. 2. However, the inlet 42 and outlet 44 may be positioned at any height on the enclosure 20 without departing from the scope of the present invention.

The first actuatable barrier 22 and second actuatable barrier 24 are provided for adjusting the cross-sectional area of the first opening 46 of the inlet 42 and the cross-sectional area of the second opening 48 of the outlet 44, respectively. The actuatable barriers 22, 24 may be any device and have any configuration that enable the barriers 22, 24 to adjust the cross-sectional areas of the openings 46, 48, such as a plurality of valves, doors, windows, lids, flaps, blinds, shutters, or the like. For example, as shown in FIG. 1, the actuatable barriers 22, 24 are positioned on tracks 50, 52 attached to the walls 32, 36 so that the barriers 22, 24 can slidably move along the tracks 50, 52. The lowering of the barriers 22, 24 along the tracks 50, 52 cause barriers 22, 24 to cover portions and/or all of the openings 46, 48, thereby reducing the cross-sectional areas of the openings 46, 48.

The actuator 26 actuates the actuatable barriers 22, 24. The actuator 26 may include any device or system configured to cause the actuatable barriers 22, 24 to modify the cross-sectional areas of the openings 46, 48. For example, the actuator 26 may be a motor, a hydraulic system, a mechanical system, an electrical system, or the like.

The sensor 28 senses various aspects of the gas flow about the enclosure 20. The sensor 28 may be configured to detect a pressure at the inlet 42, a pressure at the outlet 44, a velocity of gas flow at the inlet 42, and/or a velocity of gas flow at the outlet 44. The laser welding system 10 may include a plurality of sensors 28 that measure different aspects of the gas flow. The sensor 28 may be a pressure sensor, such as a piezoelectric pressure sensor, a wind sensor, such as an anemometer, or the like.

Figure 3:
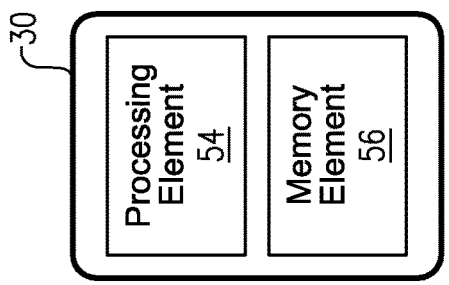
FIG. 3 is a block diagram of a controller of the laser welding system of FIG. 1.

The controller 30 is provided for directing the actuator 26 to adjust the cross-sectional areas of the openings 46, 48 via the barriers 22, 24 in order to ensure uniform, laminar gas flow through the process area 40. The controller 30 may be in communication with the laser 14, actuator 26, and sensor 28 and include a processing element 54 and a memory element 56, as depicted in FIG. 3.

The processing element 54 may run a computer program stored in or on computer-readable medium residing on the memory element 56 or otherwise accessible by the processing element 54. The computer program may preferably comprise ordered listings of executable instructions for implementing logical functions by the processing element 54. The computer program may be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device.

The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random-access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into the controller 30 and/or other computing devices.

The memory element 56 of the controller 30 may include, for example, removable and non-removable memory elements such as RAM, ROM, flash, magnetic, optical, USB memory devices, and/or other conventional memory elements. The memory element 56 may store various data associated with the controller 30, such as the computer program and code segments mentioned above, or other data related to the signal to perform the steps described herein.

The processing element 54 directs the actuator 26 to actuate the first actuatable barrier 22 and the second actuatable barrier 24 so that the cross-sectional area of the first opening 46 is larger than the cross-sectional area of the second opening 48. This makes it so that a pressure at the inlet 42 is greater than a pressure at the outlet 44. The processing element 54 may also direct the actuator 26 to actuate the first actuatable barrier 22 and the second actuatable barrier 24 so that a velocity of gas flow at the inlet 42 is lower than a velocity of gas flow at the outlet 44. This may include directing the actuator 26 to actuate the first actuatable barrier 22 so that the cross-sectional area of the first opening 46 is increased and/or directing the actuator 26 to actuate the second actuatable barrier 24 so that the cross-sectional area of the second opening 48 is decreased.

The increased cross-sectional area of the first opening 46 decreases the static pressure at the outlet 44. By decreasing the cross-sectional area of the opening 48 of the outlet 44, the velocity of gas flow through the outlet 44 would have to increase. This relationship between the static pressure $p_1$ at the inlet 42, the velocity $v_1$ of gas flow at the inlet 42, the static pressure $p_2$ at the outlet 44, and the velocity $v_2$ of gas flow at the outlet 44 may be defined by equation 1 below, wherein p represents the density of gas, g represents the gravitational constant, $z_1$ represents a height of the inlet 42, $z_2$ represents a height of the outlet 44, and $h_L$ represents a head loss of the gas flow across the process area 40.

$$\frac{p_1}{\rho g} + \frac{v_1^2}{2g} + z_1 = \frac{p_2}{\rho g} + \frac{v_2^2}{2g} + z_2 + h_L \quad (1)$$

In some embodiments, the processing element 54 may be further configured to receive signals from the sensor 28 representative of the pressure at the inlet 42, the pressure at the outlet 44, the velocity of gas flow at the inlet 42, and/or the velocity of gas flow at the outlet 44. The processing element 54 may be configured to analyze the static pressure at the inlet 42, the static pressure at the outlet 44, the velocity of gas flow at the inlet 42, and/or the velocity of gas flow at the outlet 44 to determine whether there is uniform, laminar gas flow over the process area 40. If the processing element 54 determines that the gas flow is not uniform and/or laminar, for example, based on too small of a pressure differential between the inlet 42 and the outlet 44, then the processing element 54 may direct the actuator 26 to actuate the first actuatable barrier 22 and/or the second actuatable barrier 24. The processing element 54 may also be in communication with the laser 14 for directing its power output and/or other functions.

The apparatus 16 may further comprise one or more blowers 58, 60 for affecting the velocity of gas flow and/or pressure at the inlet 42 and/or outlet 44. The blowers 58, 60 may include fans, pumps, nozzles, vacuums, valves, a combination thereof, and/or any other device or system for introducing gas flow into the enclosure 20. One of the blowers 58 may be positioned at the inlet 42 and be configured to blow gas into the inlet 42. The other blower 60 may be positioned at the outlet 44 and be configured to pull gas out of the enclosure 20 by reducing relative pressure at the outlet 42, similar to a vacuum. The speeds of the blowers 58, 60 may be controlled by the processing element 54 of the controller 30. The processing element 54 may be configured to increase and/or decrease the speeds of the blowers 58, 60 in order to affect the velocity of gas flow and/or static pressure at the inlet 42 and/or outlet 44. For example, the processing element 54 may be configured to increase the speed of the blower 60 at the outlet 44 in order to decrease the pressure at the outlet 44. The processing element 54 may be configured to adjust the speeds of the blowers 58, 60 in conjunction with directing the actuator 26 to actuate the barriers 22, 24 in order to achieve an optimal uniform, laminar gas flow over the process area 40.

The apparatus 16 may also include a nozzle 62, a controllable valve 64, and a source 66 for introducing other gases and/or cooling agents into the enclosure 20. The gases and/or cooling agents may be used to control the temperature of the component 12 and/or prevent fires during the processing of the component 12. The cooling agent may be a gas or liquid meant for lowering the temperature of the component 12 or a component in the processing area 40. The nozzle 62 may be positioned at the inlet 42 for emitting the gas and/or cooling agent into the enclosure 20 through the first opening 46. The nozzle 62 may be in fluid communication with the source 66, which stores and/or receives the gas and/or cooling agent. The valve 64 may be configured to close in order to prevent the gas and/or cooling agent from being emitted from the nozzle 62. The valve 64 may also be configured to open to allow the gas and/or cooling agent to be emitted from the nozzle 62. The valve 64 may also be partially opened in order to control the stream of gas and/or cooling agent emitted from the nozzle 62. The processing element 54 of the controller 30 may be configured to direct the valve 64 to open, close, and/or modify the stream of gas and/or cooling agent.

In use, the laser welding system 10 is configured to weld a component 12 using a laser 14. The component 12 may be placed on the platform 18 of the apparatus 16 and in the process area 40 surrounded by the enclosure 20. The laser 14 emits its light on the component 12 to perform the processing thereof. The sensor 28 detects at least one of the pressure at the inlet 42, the pressure at the outlet 44, the velocity of gas flow at the inlet 42, and the velocity of gas flow at the outlet 44. The controller 30 may receive and analyze at least one of the pressure at the inlet 42, the pressure at the outlet 44, the velocity of gas flow at the inlet 42, and the velocity of gas flow at the outlet 44 to determine whether there is uniform, laminar gas flow over the process area 40. If the processing element 54 of the controller 30 determines that there is not uniform, laminar gas flow over the process area 40, the processing element 54 may be configured to direct the actuator 26 to actuate the first actuatable barrier 22 and/or the second actuatable barrier 24 so that the cross-sectional area of the first opening 46 is larger than the cross-sectional area of the second opening 48 so that a pressure at the inlet 42 is greater than a pressure at the outlet 44.

The processing element 54 may additionally or alternatively be configured to direct one or more of the blowers 58, 60 to turn on and/or increase their speeds to affect the velocity and/or pressure at the inlet 42 and/or outlet 44. Additionally, the processing element 54 may be configured to direct the valve 64 to introduce gas and/or a cooling agent into the enclosure 20.

Figure 4:
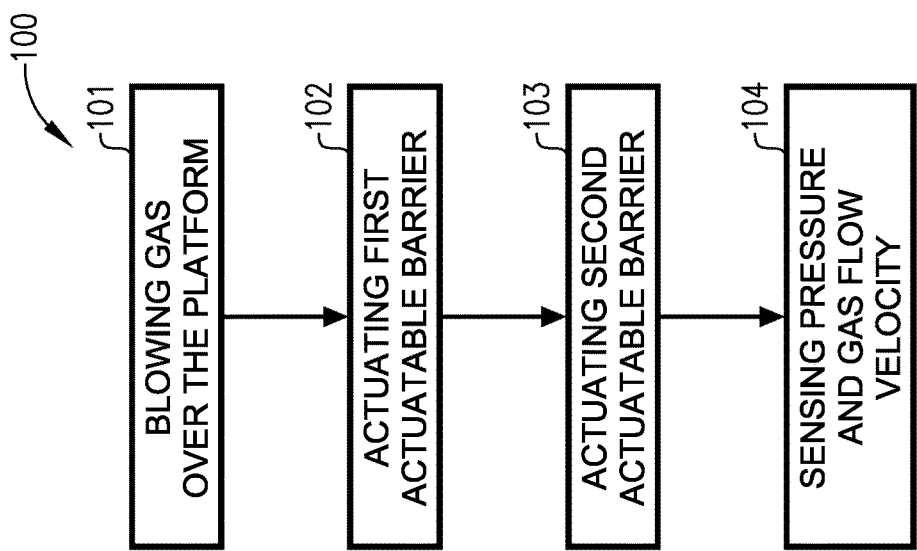
FIG. 4 is a flowchart illustrating at least a portion of the steps for ensuring uniform, laminar gas flow in a laser welding system.

The flow chart of FIG. 4 depicts the steps of an exemplary method 100 of ensuring uniform, laminar flow of gas over a process area 40 of a laser welding system 10. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-3. For example, the steps of the method 100 may be performed by the laser 14, apparatus 16, platform 18, enclosure 20, first actuatable barrier 22, second actuatable barrier 24, actuator 26, sensor 28, controller 30, blowers 58, 60, nozzle 62, valve 62, and source 64 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, blowing gas over the platform 18 in the process area 40 during laser welding. The gas may be inert gas and may be recirculated gas or once-through gas. The gas may be pressurized or blown via the blowers 58, 60.

Referring to step 102, the first actuatable barrier 22 may be actuated to modify the cross-sectional area of the opening 46 of the inlet 42. The first actuatable barrier 22 may be actuated by the actuator 26. The first actuatable barrier 22 may be actuated so that it increases the cross-sectional area of the opening 46. Alternatively, the first actuatable barrier 22 may be actuated so that it decreases the cross-sectional area of the opening 46.

Referring to step 103, the second actuatable barrier 24 may be actuated to modify the cross-sectional area of the opening 48 of an outlet 44 so that the cross-sectional area of the opening 46 of the inlet 42 is larger than the cross-sectional area of the opening 48 of the outlet 44. This makes it so that the pressure at the inlet 42 is greater than the pressure at the outlet 44. The second actuatable barrier 24 may be actuated by the actuator 26. The second actuatable barrier 24 may also be actuated so that it decreases the cross-sectional area of the opening 48. Alternatively, the second actuatable barrier 24 may be actuated so that it decreases the cross-sectional area of the opening 48.

Referring to step 104, the pressure at the inlet 42, the pressure at the outlet 44, the velocity of gas flow at the inlet 42, and/or the velocity of gas flow at the outlet 44 may be sensed. One or more sensor 28 may be used to sense the pressure at the inlet 42, the pressure at the outlet 44, the velocity of gas flow at the inlet 42, and/or the velocity of gas flow at the outlet 44. These measurements may be used by the processing element 54 to determine whether the first and/or second actuatable barriers 22, 24 should be actuated.

The method 100 may include additional, less, or alternate steps and/or device(s), including those discussed elsewhere herein. For example, the steps 102, 103 of actuating actuatable barriers 22, 24 may include determining whether there is laminar gas flow over the processing area 40 using the sensors 28 and processing element 54. The steps 102, 103 of actuating actuatable barriers 22, 24 may also include actuating the actuatable barriers 22, 24 until a velocity of gas flow at the inlet 42 is lower than a velocity of gas flow at the outlet 44. This may be accomplished by actuating the first actuatable barrier 22 so that the cross-sectional area of the first opening 46 is increased and/or actuating the second actuatable barrier 24 so that the second opening 48 is decreased.

The method 100 may include a step of blowing gas into the process area 40 via one or more blowers 58, 60. The speed of the blowers 58, 60 may be adjusted so that the velocity of the gas flow at the inlet 42 is lower than the velocity of the gas flow at the outlet 44. The method 100 may also include a step of introducing inert gas and/or cooling spray into the process area 40 via the nozzle 62.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An apparatus for ensuring uniform laminar gas flow in the vicinity of a part being processed by a laser welding system, the apparatus comprising:
   a laser for welding the part;
   a platform for supporting the part to be processed;
   an enclosure including a plurality of walls surrounding the platform, the enclosure including:
   an inlet on a first wall and configured to receive gas flow from outside the enclosure, and
   an outlet on a second wall and positioned on an opposite side of the first wall and configured to allow the gas flow to exit the enclosure so that at least a portion of the gas flow travels over the platform;
   a first actuatable barrier positioned on a first track attached to the first wall so that the first actuatable barrier slidably moves along the first track, the first actuatable barrier at least partially defining a first opening at the inlet and configured to modify a cross-sectional area of the first opening when actuated;
   a second actuatable barrier positioned on a second track attached to the second wall so that the second actuatable barrier slidably moves along the second track, the second actuatable barrier at least partially defining a second opening at the outlet and configured to modify a cross-sectional area of the second opening when actuated;

an actuator configured to actuate at least one of the first actuatable barrier or the second actuatable barrier; and
a controller configured to control the actuator to actuate at least one of the first actuatable barrier or the second actuatable barrier as the part is being processed by the laser welding system so that the cross-sectional area of the first opening is larger than the cross-sectional area of the second opening and so that a pressure at the inlet is greater than a pressure at the outlet while the gas flow travels through the first opening and the second opening.

2. The apparatus of claim 1, wherein the controller is configured to direct the actuator to actuate at least one of the first actuatable barrier or the second actuatable barrier so that a velocity of the gas flow at the inlet is lower than a velocity of the gas flow at the outlet.

3. The apparatus of claim 1, further comprising a sensor connected to the controller and configured to detect at least one of the pressure at the inlet, the pressure at the outlet, a velocity of the gas flow at the inlet, or a velocity of the gas flow at the outlet.

4. The apparatus of claim 1, wherein the platform includes a powder bed.

5. The apparatus of claim 1, further comprising a first blower positioned proximate to the inlet and configured to blow the gas into the inlet.

6. The apparatus of claim 5, wherein the controller is connected to the first blower and is configured to adjust a speed of the first blower so that a velocity of the gas flow at the inlet is lower than a velocity of gas flow at the outlet.

7. The apparatus of claim 1, further comprising a second blower positioned at the outlet and configured to pull the gas out of the enclosure through the outlet.

8. The apparatus of claim 7, wherein the controller is connected to the second blower and is configured to adjust a speed of the second blower so that a velocity of the gas flow at the inlet is lower than a velocity of the gas flow at the outlet.

9. The apparatus of claim 1, further comprising a nozzle connected to a cooling agent source and configured to introduce cooling agent into the enclosure.

10. The apparatus of claim 9, further comprising a valve connected to the cooling agent source and configured to be activated by the controller.

11. The apparatus of claim 1, wherein the inlet is positioned on the enclosure at a higher height than the outlet.

* * * * *